United States Patent [19]
Sullivan et al.

[11] Patent Number: 5,397,840
[45] Date of Patent: Mar. 14, 1995

[54] GOLF BALL COVER HAVING AN IONIC COPOLYMER/NON-IONIC COPOLYMER BLEND

[75] Inventors: Michael J. Sullivan, Chicopee, Mass.; Terence Melvin, Somers, Conn.

[73] Assignee: Spalding & Evenflo Companies, Inc., Tampa, Fla.

[21] Appl. No.: 22,787

[22] Filed: Feb. 23, 1993

Related U.S. Application Data

[63] Continuation of Ser. No. 753,485, Sep. 3, 1991, abandoned.

[51] Int. Cl.$^6$ .............. A63B 37/12; C08L 23/26; C08L 33/02; C08L 33/06
[52] U.S. Cl. .................. 525/221; 525/196; 525/197; 273/235 R; 260/998.14; 524/908
[58] Field of Search .............. 525/221, 196, 197; 273/235 R

[56] References Cited

U.S. PATENT DOCUMENTS

| | | | |
|---|---|---|---|
| 3,365,520 | 1/1968 | Foster et al. | 525/201 |
| 3,789,035 | 1/1974 | Iwami et al. | 525/228 |
| 4,690,981 | 9/1987 | Statz | 525/221 |
| 4,911,451 | 3/1990 | Sullivan et al. | 260/998.14 |
| 4,956,414 | 9/1990 | Muehlenbernd et al. | 525/196 |

FOREIGN PATENT DOCUMENTS 61-044937 3/1986 Japan ................. 525/221

*Primary Examiner*—Carman J. Seccuro, Jr.
*Attorney, Agent, or Firm*—McAndrews, Held & Malloy, Ltd.

[57] ABSTRACT

The present invention is directed to a golf ball cover comprising a blend of copolymers wherein one or more of the copolymers is a low cost nonionic copolymer and one or more of the copolymers is an ionic copolymer. Surprisingly, a golf ball cover comprising the non-ionic-/ionic copolymer blend exhibits no loss in C.O.R., and has equal resistance to cutting and cracking when compared to top grade golf ball covers made with one of the conventional 100% ionic copolymer blends. In particular, the present golf ball cover comprises from about 95 to about 80 pphr of one or more ionic copolymers, and from about 5 to about 20 pphr of one or more non-ionic copolymers, the latter being selected from the group consisting of a copolymer of ethylene and acrylic acid, a copolymer of ethylene and methacrylic acid, a copolymer of polypropylene and acrylic acid, a terpolymer of ethylene, acrylic acid and a lower alkyl acrylate, and a terpolymer of ethylene, methacrylic acid and a lower alkyl acrylate, and blends thereof.

14 Claims, No Drawings

GOLF BALL COVER HAVING AN IONIC COPOLYMER/NON-IONIC COPOLYMER BLEND

This is a continuation of U.S. patent application Ser. No. 07/753,485, filed Sept. 3, 1991, now abandoned.

BACKGROUND OF THE INVENTION a. Field of the Invention

This invention relates to a novel golf ball cover which contains a low cost non-ionic copolymer in combination with an ionic copolymer. More particularly, the present invention relates to a golf ball cover containing at least one ionic copolymer and at least one non-ionic copolymer wherein the latter is selected from the group consisting of a copolymer of ethylene and acrylic acid, a copolymer of ethylene and methacrylic acid, a copolymer of polypropylene and acrylic acid, and blends thereof. The present invention is useful because it provides a high quality golf ball cover at a relatively low cost.

b. Prior Art

Although the core and the cover both contribute to the coefficient of restitution ("C.O.R."), for the purposes of this invention, we are concerned solely with the C.O.R. as affected by the cover material. The C.O.R. is generally measured by propelling a finished golf ball against a hard surface at a fixed velocity. After the ball has rebounded from the surface, its velocity is again measured. The ratio of the rebound velocity over the in-going or propelled velocity is the C.O.R. The C.O.R. must be carefully controlled in all commercial golf balls in order for the ball to be within the 255 ft./second initial velocity set down by the United States Golfer's Association.

Golf ball covers having a high C.O.R. and a combination of other beneficial properties, such as high durability, a high cut resistance, and a long life, have traditionally been made from a blend of two or more ionic copolymers in particular proportions. For example, U.S. Pat. No. 3,819,768 (Molitor) discloses a golf ball cover having these mentioned properties comprising a mixture of from 10%–90% of an ionic copolymer of a sodium salt and from 90%–10% of an ionic copolymer of a zinc salt. U.S. Pat. No. 4,333,247 (Ketches et al.) discloses a golf ball cover composed of at least three ionic copolymers. A problem with these golf ball covers is that they require that 100% of the copolymer in the composition be ionic. Even U.S. Pat. No. 3,454,280 (Harrison), which utilized a single ionic copolymer required that it constitute 100% of the disclosed covers. However, a disadvantage with utilizing 100% ionic copolymers as the sole source of copolymer in a golf ball cover is that the ionic copolymers are expensive.

Golf ball covers produced from less expensive copolymers of varying types have lacked the durability, the cut resistance, and the high C.O.R. exhibited by golf ball covers containing 100% ionic copolymers.

U.S. Pat. No. 3,454,676 (Busse) teaches the blend of an ionic copolymer with an elastomer to produce a solid one piece golf ball. Although the ionic copolymer/elastomer blend of Busse was suited for producing 1 piece golf balls, such as used on driving ranges, it had an insufficient C.O.R. durability and cut resistance to be used as the thin skinned cover material in the production of a high quality two-piece or three-piece competition golf ball.

Other compositions which were directed toward improving the characteristics of a golf ball cover included mixtures of an ionomer resin either with chlorosulfonated polyethylene (e.g., U.S. Pat. No. 3,940,146) or with an ethylene-vinyl acetate copolymer. However, according to U.S. Pat. No. 4,234,184 (Deleens, et al.), which was filed on Feb. 15, 1979, "the covers prepared from these [two]compositions [amongst others]were not judged wholly satisfactory."

An object of the present invention is to produce a less costly golf ball cover that does not significantly sacrifice the desirable properties of high durability, high cut resistance, and high C.O.R. (or initial velocity) which are found in golf ball covers employing 100% ionic copolymer.

SUMMARY OF THE INVENTION

The present invention is directed to a high quality golf ball cover comprising a blend of copolymers wherein at least one of the copolymers is an ionic copolymer and at least one of the copolymers is a low cost non-ionic copolymer. Surprisingly, a golf ball cover having the disclosed ionic copolymer/non-ionic copolymer blend exhibits no decrease in durability or cut resistance when compared to covers made with conventional blends of two or more ionic copolymers. In particular, the present invention is a golf ball cover comprising a copolymer blend having from about 95 to about 80 parts of from one to three ionic copolymers and from about 5 to about 20 parts of from one to three non-ionic copolymers. More preferably, the cover material of the present invention contains from about 90 to about 85 parts of from one to three ionic copolymers and from about 10 to about 15 parts of from one to three non-ionic copolymers.

DETAILED DESCRIPTION OF THE INVENTION

The present invention is directed to a golf ball cover. In its broad aspect, the cover material of the invention comprises a polymer blend having from about 95 to about 80 parts of from one to about three ionic copolymers and from about 5 to about 20 parts of from one to about three non-ionic copolymers. More preferably, the cover material of the present invention contains from about 90 to about 85 parts of from one to about three ionic copolymers and from about 10 to about 15 parts from one to about three non-ionic copolymers.

By the term "parts" or "pphr" as used herein is meant parts by weight per 100 parts of polymer resin.

By the term "ionic copolymer" or "ionomer" as used herein is meant to include a copolymer of an alpha olefin ("α-olefin") that has from 2–6 carbon atoms and of a metal salt of an $\alpha\beta$-unsaturated carboxylic acid that has from 3–5 carbon atoms, such that the acid units, which comprise 9–15% by weight of the copolymer, are randomly distributed along the copolymer chain. The acid units in the described copolymer are partially neutralized to the extent desired, typically from about 18% to about 80%, to produce carboxylate anions having metal cations. The metal cations are sodium, potassium, lithium, calcium, magnesium, zinc or a combination thereof. Preferably, the metal ion is sodium or zinc. Because neutralization of the ionic copolymer is only partial, the terms used herein, relating to the "salt of an $\alpha,\beta$-unsaturated carboxylic acid," are understood to mean the partially neutralized salt of that acid. The production of ionic copolymers is taught in U.S. Pat.

No. 3,264,272 and 3,421,766, which are incorporated herein by reference.

By the term "non-ionic copolymer" as used herein is meant to include a copolymer that is either a copolymer of ethylene and acrylic acid, a copolymer of ethylene and methacrylic acid, a copolymer of propylene and acrylic acid, or a blend thereof. It is further meant to include terpolymers of ethylene, acrylic or methacrylic acid, and a softening third component selected from the group of lower alkyl acrylates and lower alkyl methacrylates. By the term "lower alkyl" as used herein is meant straight or branched chain hydrocarbons having from 1-4 carbon atoms.

Ionic copolymers for use in the present invention are commercially available. The sodium and zinc neutralized copolymers of ethylene and acrylic acid are commercially available under the trademark Escor® and/or Iotek® from Exxon Chemical Co., Houston, Tex. The Escor® and/or Iotek® copolymers vary from one another as to neutralizing ion (sodium, potassium, lithium, calcium, magnesium or zinc), the ratio of the ethylene and acrylic acid components, and the percentage of neutralization. Ionic copolymers of ethylene and methacrylic acid are commercially available under the trademark Surlyne® from DuPont Co., Wilmington, Del. Like the Escor® copolymers, the Surlyn® copolymers also differ from one another as to neutralizing ion (sodium or zinc), the ratio of components, and the percentage of neutralization.

Of the ionic copolymers, two of the materials of choice are Escor® 4000 and Escor® 900. (Escor® 4000 and 900 have since been re-named as Iotek® 7030 and Iotek® 8000). A preferred ionic copolymer is also the DuPont copolymer Surlyn® 1559, a sodium neutralized ionic copolymer, now also referred to by DuPont as Surlyn® 8528. Other Escor® copolymers that may provide satisfactory results are Escor® 4200, 906, 562, 8020, 8030, 7010, and 7020.

The non-ionized copolymer will preferably be either an ethylene-methacrylic acid copolymer or an ethylene-acrylic acid copolymer. Most preferably, it is an ethylene-acrylic acid copolymer. Ethylene-acrylic acid copolymer is commercially available under the trademark Primacor® (Dow Chemical Co., Midland, Mich.), while ethylene-methacrylic acid copolymer is commercially available under the trademark Nucrel® (DuPont, Wilmington, Del.). Other non-ionized copolymers, such as polypropylene-acrylic acid copolymers, are commercially available under the trademark Polybond® (BP Performance Polymers Inc., Hackettstown, N.J.). Non-ionized terpolymers that are suitable for use in the present invention include the ethylene-acrylic acid based terpolymers of Exxon that are commercially available under the ESCOR® trademark, such as ATX 310, ATX 320, ATX 325, and ATX 350. It is believed that the third component of the ESCOR ethylene-acrylic acid terpolymers is a lower alkyl acrylate or methacrylate, such as butyl acrylate or butyl methacrylate.

Table 1 lists the compositions in weight percent of the components both in a "top grade" and in a "low cost" Surlyn® based golf ball cover. Although three (3) different ionic copolymers are employed to form both the "top grade" and the "low cost" Surlyn golf ball covers, the copolymer blend in each cover is 100% ionic copolymer. These ionic copolymer covers represent the control material against which the ionic/non-ionic cover material of the present invention is compared.

Table 2 compares the properties of a golf ball having the "top grade" all ionomer cover (Formulation −1) to a number of otherwise identical golf balls (Formulations −2 to −13) which differ from Formulation −1 in that they have a cover that contains 5, 10 or 15 pphr of various non-ionic copolymers in the copolymer blend. Specifically, Formulations −11 to −13 represent golf balls having covers comprising a blend of the "top grade" Surlyn® to which was added 5, 10, and 15 pphr respectively of the monocomponent polymer, low density polyethylene ("LDPE"), which is commercially available as Alathon 2010. For formulations −11 to −13, the C.O.R., the barrel test, and the cut test each indicated significantly decreasing performance with increasing amounts of LDPE. Even the addition of only 5% LDPE to the cover composition caused the C.O.R. of the golf ball to drop from 0.807 to 0.801, a drop of 0.006 relative to the identical golf ball with the 100% ionic copolymer ("top grade") cover.

Formulations −8 to −10 represent golf balls having covers comprising the "top grade" Surlyn® to which was added 5, 10, and 15 pphr respectively of a copolymer of ethylene and vinyl acetate, i.e., Elvax® 560, which is available from DuPont, Wilmington, Del. For the three formulations tested, the C.O.R., the barrel test, and the cut test each indicated decreasing performance with increasing amounts of the ethylene-vinyl acetate copolymer in the cover composition. Overall, the results were better when ethylene-vinyl acetate copolymer was the additive, rather than when LDPE was the additive. Nevertheless, when ethylene-vinyl acetate copolymer was present in the cover at 15 pphr (Formulation −10), five out of six balls broke in the barrel test. The "barrel test" or "Barrel Durability Testing" involves firing golf balls at 135 ft./sec. (at 72° F.), into a 5-sided container, the walls of which are steel plates that have grooves milled into them to simulate a golf club face. The balls are subjected to 100 to 300 blows and are inspected at regular intervals for breakage (i.e., any signs of cover cracking or delamination).

Formulations −5 to −7 represent golf balls having covers of the present invention. These covers comprise a blend of the "top grade" Surlyn® with 5, 10, and 15 pphr respectively of the copolymer of ethylene and an acrylic acid, Primacor® 1430, which is available from Dow Chemical Co., Midland, Mich. For formulations −5 to −7, there wasn't any significant decrease in any of the observed properties. Even when the ethylene and acrylic acid copolymer (Primacor® 1430) comprised 15 pphr of the copolymer in the composition, the C.O.R. only decreased from 0.807 to 0.806 relative to the control represented by the 100% ionic copolymer composition of Formulation −1. Further, there was no significant decrease in durability. The durability was based upon no breaks ("N.B.") in the barrel test and upon no increase in the severity of cuts during the cut test. The "cut test" involves firing a golf ball at 135 ft./sec. against the leading edge of a pitching wedge, wherein the leading edge radius is 1/32", the loft angle is 51 degrees, the sole radius is 2.5", and the bounce angle is 7 degrees. The cut resistance of the balls tested was evaluated on a scale of 1-5. The number 5 represents a cut that extends completely through the cover to the core; 4 represents a cut that does not extend completely through the cover but that does break the surface; 3 does not break the surface but does leave a permanent dent; 2 leaves only a slight crease which is permanent but not as severe as 3; 1 represents virtually no visible indentation or damage of any sort.

Formulations −2 to −4 also represent golf balls having covers of the present invention. In Formulations −2 to −4, the non-ionic copolymer is a copolymer of ethylene and methacrylic acid, i.e., Nucrel® 925, which is available from DuPont. When the copolymer of ethylene and methacrylic acid comprised up to 15 pphr of the copolymer blend in the golf ball cover, no significant decrease was observed in the C.O.R. nor in the durability of those golf balls.

Table 3 compares the properties of golf balls having top grade ("TG") Surlyn® and low cost ("LC") Surlyn® covers to those same golf balls having covers comprising either TG or LC Surlyn® to which has been added 10 and 15 pphr by weight of Primacor® 1430, respectively. In preparing Table 3, 25 dozen golf balls of each type were measured. As reflected in Table 3, the golf balls that had covers comprising the ionic/non-ionic copolymer blend tested satisfactorily for cold crack resistance, cut resistance, paint adhesion and durability in the barrel test. The C.O.R.s show only a slight decrease upon addition of non-ionic copolymer to both LC and TG.

After three months of range testing the golf balls of Table 3, those golf ball covers that contained 10 pphr ethylene-acrylic acid copolymer (Primacor®) in both the TG and LC Surlyn® base performed equal to those covers that were 100% TG and 100% LC Surlyn, i.e., all ionomer. At the 15 pphr Primacor® level, there was a noticeable, but not significant, increase in the number of scratched and cut balls in the "cut test".

Tables 4 and 5 compare the properties of golf balls having a top grade Iotek (100% ionomer) cover to those same golf balls having a cover comprising top grade Iotek to which has been added 5, 10, 15 and 20 parts respectively of the non-ionic copolymers as defined herein. In Table 4, the non-ionic copolymers included: Primacor 5981 (75 wt. % ethylene and 25 wt. % acrylic acid); Nucrel 925 (85 wt. % ethylene and 15 wt. % methacrylic acid; Primacor 3414 (85 wt. % ethylene and 15 wt. % acrylic acid; and Nucrel 010 (a terpolymer of ethylene, methacrylic acid and iso-butyl acrylate).

In Table 4, each of the golf balls having a cover that was a blend from 95–80 parts of top grade Iotek with from 5–20 parts respectively of the non-ionic copolymer exhibited an observed coefficient of restitution ("C.O.R.") that was significantly greater than the "expected C.O.R." The "expected C.O.R." of a golf ball having a cover that is a blend of an ionic copolymer component and a non-ionic copolymer component is obtained by a constructing graph. In contracting the graph, the golf ball having a cover that is 100 pphr "ionic copolymer" is arbitrarily positioned at one end of the x-axis, whereas the golf ball having a cover that is 100 pphr "non-ionic copolymer" is positioned at the opposite end of the x-axis. The C.O.R.s for each of the respective golf balls are plotted on the y-axis. In the present case, the graph is such that the golf ball having the 100% top grade Iotek (ionic copolymer) cover is plotted at one end of the x-axis and the golf ball having a 100% non-ionic copolymer cover is plotted at the arbitrarily set opposite end. The measured C.O.R. (Table 6) for each of the two covers is then plotted and connected by a straight line. This line traverses all intermediate cover compositions and predicts the "expected C.O.R." of all golf balls having covers that are a blend of those two components. For example, the expected C.O.R. of a golf ball having a cover that is a 50:50 copolymer blend of top grade Iotek and a non-ionomer would be determined off the appropriate graph by locating the point along the C.O.R. line that, according to the x-axis, is half way (50/50) between the 100% ionic copolymer and the 100% non-ionic copolymer compositions. The "expected C.O.R." for that point is then determined by locating across on the y-axis the C.O.R. that corresponds to that point.

Also, in Table 4, the cold crack test indicated that golf balls having the blended ionic copolymer/non-ionic copolymer covers of the present invention did not exhibit cold cracking (N.B.=no breaks). This is the same result that was obtained with golf balls having the more expensive covers composed of 100 pphr top-grade Iotek (i.e., 100% ionomer).

According to the cut test in Table 4, there was an increase in the cut rate of golf ball covers comprising a blend of the top grade Iotek at 85 and 80 pphr and the non-ionic terpolymer, Nucrel 010, at 15 and 20 pphr respectively.

Table 5 is analogous to Table 4 and reflects the properties of golf balls having the top grade Iotek cover to which was added 5, 10, 15 or 20 pphr of non-ionic copolymer. In Table 5, the ionic/non-ionic copolymer blend covers employed three Escor (non-ionomer) terpolymer resins in the 5–20 pphr range. Of the three Escor resins, ATX 310 was the hardest and ATX 325 was the softest. In Table 5, the golf balls having the ionic copolymer/non-ionic copolymer blended covers showed no increase in the cold cracking notwithstanding the dilutional effect by the non-ionomer on the cross linking in ionomer resin. Moreover, the combination of top grade Iotek with Escor ATX 310 exhibited a C.O.R. that was greater than predicted when Escor ATX 310 comprised 10, 15, and 20 pphr in the copolymer blend of the cover. With the two increasingly softer Escor resins, ATX 320 and 325 respectively, softer covers, as manifested by an increasingly lower C.O.R. is produced. To the professional golfer, a golf ball with the softer cover is preferred. Softer golf balls have better spin characteristics and are capable of gripping the green. In contrast, golf balls with a harder cover are preferred by the average golfer to obtain not only greater distance but greater golf ball durability. Thus, there is a tradeoff between hardness, which provides distance and durability to the non-pro golfer, and softness, which imparts the control desired by the professional golfer.

Like the terpolymer of Table 4, (i.e., Nucrel 010), the three terpolymers of Table 5 all produced softer golf ball covers such as preferred by the professional golfer.

Thus, according to the data in Tables 4 and 5, golf ball covers that are a blend of from 95–80 pphr of ionic copolymer, such as top grade Iotek, and from 5–20 pphr of a non-ionic copolymer, such as those described herein, all exhibit good cold crack resistance. Tables 4 and 5 also generally indicate that golf ball covers having unexpectedly increased C.O.R.s with no loss in cut resistance occur when the non-ionomeric copolymer has only two polymeric components, i.e., is not a terpolymer. (Although Escor ATX 310 is at least a partial exception).

Table 6 compares the observed C.O.R. of golf balls having the top grade Iotek cover, i.e., an all ionic copolymer cover, to a variety of golf balls, each having an all (i.e., 100 pphr) non-ionic copolymer cover. Table 6 also normalizes the observed C.O.R.s of the golf balls having the non-ionomer covers relative to the observed C.O.R. for golf balls having the "top grade" Iotek cover of Tables 4 and 5. Normalization compensates for differences in the lots of core material between Tables 4–6 and permits the graphic drawing of an expected line of C.O.R.s for the blended ionomer/non-ionomer covers of Tables 4 and 5.

The golf ball covers of the present invention are formulated by mixing from about 95 to about 80 parts of at least one ionic copolymer and from about 5 to about 20 parts of at least one non-ionic copolymer, preferably from about 90 to about 85 parts of at least one ionic copolymer and from about 10 to about 15 parts of at least one non-ionic copolymer.

The non-ionic copolymer is preferably the copolymer of ethylene and acrylic acid or ethylene and methacrylic acid.

It is within the scope of the present invention to admix into the cover composition compatible materials in amounts sufficient to achieve the desired effect but which do not affect the basic and novel characteristics of the ionic/non-ionic copolymer composition of this invention. Among such materials are coloring agents, including dyes and pigments, fillers, and additives such as antioxidants, antistatic agents, and stabilizers.

Suitable fillers known to the art, but are not hereby limited to, include titanium dioxide, zinc oxide, barium sulfate, zinc sulfate, and the like. Such fillers generally present in the covering composition in amounts ranging from about 1 pphr to about 10 pphr based upon 100 parts ionomer resin. Preferably, titanium dioxide is employed as a filler in amounts of from about 1 pphr to about 5 pphr.

Antioxidants, such as Santonox R (Monsanto), when used, are generally present in amounts of from about 0.001 pphr to about 0.10 pphr based upon 100 parts of ionomer resin. The preferred antioxidant is Santonox R.

The mixing of the copolymers and other components of the golf ball cover composition is accomplished on a mixer, such as a Banbury mixer or a rubber mill, to which sufficient heat is applied (e.g., 130°–150° C., i.e., 292°–328° F.) to obtain a homogeneous mixture. The use of such techniques is well known in the art. See for example, U.S. Pat. No. 3,264,272 (Rees) which is incorporated herein by reference. The resultant homogeneous mixture of the golf ball cover composition may either be cooled and ground into pellets for later use, or fed directly into a machine for injection molding over a core or for injection molding into half shells.

The cover composition of the present invention may be used to cover both wound and solid cores. By the term "solid core" as used herein is meant not only to a one piece core, but also to those covers having a separate solid layer beneath the cover and above the core, as in U.S. Pat. No. 4,431,193, and to other multilayer and/or non-wound cores. Golf balls utilizing the present cover and/or cover composition can be formed using any one of the methods known to the art for covering cores. For example, a selected core may be placed in the center of a golf ball mold and the cover composition injected into and retained in the space for a suitable period of time at a mold temperature of from about 40° F. to about 120° F. which temperature is dependent upon the copolymer blend.

For the most preferred copolymer blend, which comprises from about 10–15 parts by weight of the ethylene-acrylic acid copolymer, Primacor ® 1430, and from about 90–85 parts by weight of the TG Surlyn ® blend, the mold temperature ranges from about 60° F. to about 75° F. for a 30 second cooling cycle.

Alternatively, the cover composition may be formed into hemispherical shells by injection molding at 300° F. to 400° F. A pair of such smooth surface shells are positioned about a core, placed in a dimpled mold, and subjected to compression molding at an appropriate temperature ranging from 100°–200° F. to achieve unification. Thus, the golf ball cover composition of this invention may be used with any method for forming golf ball covers.

The core material is not an integral part of the present invention. Hence, a detailed discussion concerning the specific types of core materials which may be utilized with the golf ball cover and cover compositions of the present invention is not specifically set forth herein. In this regard, the golf ball cover and cover compositions of the invention may be used in conjunction with any standard golf ball core.

TABLE 1

|  | Top Grade White (%) | Low Cost White (%) |
|---|---|---|
| Surlyn 1605Na | 68.53 | 68.44 |
| Surlyn 1706Zn | 21.87 | — |
| Surlyn 1554Zn | — | 22.22 |
| Surlyn 1557Zn | — | — |
| Surlyn 1559Na | 7.21 | 7.07 |
| Unitane O-110 TiO$_2$ | 2.29 | 2.25 |
| Ultra Marine Blue | 0.023 | 0.0133 |
| Uvitex OB Optical Brightener | 0.10 | — |
| Santonox R Stabilizer |  | 0.0033 |
|  | 100.023 | 99.9966 |

TABLE 2

|  | 517-12-1 | -2 | -3 | -4 | -5 | -6 | -7 | -8 | -9 | -10 | -11 | -12 | -13 |
|---|---|---|---|---|---|---|---|---|---|---|---|---|---|
| Top Grade Surlyn | 100 | 95 | 90 | 85 | 95 | 90 | 85 | 95 | 90 | 85 | 95 | 90 | 85 |
| Nucrel 925 | — | 5 | 10 | 15 | — | — | — | — | — | — | — | — | — |
| Primecor 1430 | — | — | — | — | 5 | 10 | 15 | — | — | — | — | — | — |
| Elvax 560 | — | — | — | — | — | — | — | 5 | 10 | 15 | — | — | — |
| Alathon 2010[1] | — | — | — | — | — | — | — | — | — | — | 5 | 10 | 15 |
| Weight (grams) | 45.3 | 45.2 | 45.2 | 45.2 | 45.2 | 45.2 | 45.2 | 45.2 | 45.1 | 45.1 | 45.2 | 45.2 | 45.1 |
| Compression | 58 | 55 | 55 | 57 | 57 | 57 | 58 | 56 | 57 | 53 | 55 | 55 | 55 |
| C.O.R. | .807 | .808 | .808 | .807 | .808 | .807 | .806 | .806 | .804 | .803 | .801 | .801 | .786 |
| Barrel (6 Balls tested) (300 blows each) | NB | NB | NB | NB | NB | NB | NB | NB | NB | 5 Break | 4 Bk. | 5 Bk. | 6 Bk. |
| Cut Test (1 = No visible marking) (5 = Clean Cut) | 2–3 | 2–3 | 2–3 | 3 | 2–3 | 2–3 | 3 | 3 | 3–4 | 4–5 | 3–4 | 4–5 | 4–5 |

[1]Low density polyethylene.

TABLE 3

SURLYN/PRIMACOR GOLF BALL PROPERTIES

|  | LC[1] Surlyn | TG[2] Surlyn | LC 10% Primacor | LC 15% Primacor | TG 10% Primacor | TG 15% Primacor |
|---|---|---|---|---|---|---|
| Weight | 46.2 | 45.5 | 46.1 | 46.1 | 45.4 | 45.4 |
| Compression[3] | 50 | 48 | 49 | 51 | 48 | 48 |
| Coefficient[4] | .786 | .811 | .784 | .782 | .810 | .808 |
| Cold Crack | N.B.* | N.B. | N.B. | N.B. | N.B. | N.B. |
| Barrel Test | N.B. | N.B. | N.B. | N.B. | N.B. | N.B. |
| Wet Barrel (Paint Adhesion) | E.A.** | E.A. | E.A. | E.A. | E.A. | E.A. |
| Cut Test (1 - No mark) (5 - Clean cut) | 3 | 2 | 2-3 | 2-3 | 2-3 | 2-3 |

*No Breaks
**Excellent Adhesion
[1] Low Cost.
[2] Top Grade.
[3] Riehle compression is a measurement of the deformation of a golf ball in inches under a fixed static load of 225 pounds.
[4] The coefficient of restitution (COR) was measured by firing the resulting golf ball in an air cannon at a velocity of 125 feet per second against a steel plate which is positioned 12 feet from the muzzle of the cannon. The rebound velocity was then measured. The rebound velocity was divided by the forward velocity to give the coefficient of restitution.

TABLE 4

| | Example: 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Top-Grade Iotek* | 100 | 95.0 | 90 | 85 | 95 | 90 | 85 | 95 | 90 | 85 | 95 | 90 | 85 | 80 | 80 | 80 | 80 |
| Primacor 5981 | — | 5 | 10 | 15 | — | — | — | — | — | — | — | — | — | — | — | — | 20 |
| Nucrel 925 | — | — | — | — | 5 | 10 | 15 | — | — | — | — | — | — | — | 20 | — | — |
| Primacor 3414 | — | — | — | — | — | — | — | 5 | 10 | 15 | — | — | — | 20 | — | — | — |
| Nucrel 010 | — | — | — | — | — | — | — | — | — | — | 5 | 10 | 15 | 20 | — | — | — |
| Weight | 45.4 | 45.2 | 45.2 | 45.3 | 45.1 | 45.2 | 45.3 | 45.2 | 45.2 | 45.2 | 45.2 | 45.2 | 45.2 | 45.2 | 45.1 | 45.2 | 45.3 |
| Compression | 54 | 54 | 54 | 53 | 54 | 55 | 55 | 54 | 55 | 56 | 54 | 54 | 56 | 57 | 56 | 55 | 54 |
| C.O.R. | .810 | .809 | .809 | .810 | .810 | .809 | .808 | .809 | .808 | .807 | .807 | .807 | .803 | .800 | .803 | .806 | .808 |
| (Expected C.O.R.) | — | .808 | .8065 | .805 | .608 | .8065 | .805 | .8075 | .805 | .803 | .8075 | .805 | .803 | .801 | .801 | .803 | .803 |
| Cold Crack | NB | NB | NB | NB | NB | NB | NB | NB | NB | NB | NB | NB | NB | NB | NB | NB | NB |
| Cut Test (1 = No Mark) (5 = Clean Cut) | 2-3 | 2-3 | 2-3 | 2-3 | 2-3 | 2-3 | 2-3 | 2-3 | 2-3 | 2-3 | 2-3 | 2-3 | 3 | 3 | 2-3 | 2-3 | 2-3 |

*Top-Grade Iotek (WT %)
Iotek 4000 52.38
Iotek 8000 45.20
Unitane 0-110 TiO$_2$ 2.29
Ultramarine Blue 0.023
Uvitex OB 0.10
Santonox R 0.003

TABLE 5

| | Example: 1 | 2 | 3 | 4 | 5 | 6 | 7 | 8 | 9 | 10 | 11 | 12 | 13 |
|---|---|---|---|---|---|---|---|---|---|---|---|---|---|
| Top-Grade Iotek | 100 | 95 | 90 | 85 | 80 | 95 | 90 | 85 | 80 | 95 | 90 | 85 | 80 |
| Escor ATX 310 | — | 5 | 10 | 15 | 20 | — | — | — | — | — | — | — | — |
| Escor ATX 320 | — | — | — | — | — | 5 | 10 | 15 | 20 | — | — | — | — |
| Escor ATX 325 | — | — | — | — | — | — | — | — | — | 5 | 10 | 15 | 20 |
| Weight | 45.2 | 45.2 | 45.2 | 45.2 | 45.2 | 45.2 | 45.2 | 45.2 | 45.2 | 45.2 | 45.2 | 45.2 | 45.2 |
| Compression | 57 | 57 | 58 | 57 | 57 | 57 | 57 | 59 | 61 | 58 | 59 | 59 | 62 |
| C.O.R. | .809 | .807 | .806 | .807 | .805 | .806 | .803 | .803 | .802 | .806 | .803 | .802 | .801 |
| (Expected C.O.R.) | — | .807 | .805 | .803 | .801 | .807 | .805 | .803 | .801 | .807 | .805 | .803 | .802 |
| Cold Crack | NB | NB | NB | NB | NB | NB | NB | NB | NB | NB | NB | NB | NB |
| Cut Test (1 = No mark) (5 = Clean cut) | 2-3 | 2-3 | 2-3 | 3 | 3 | 2-3 | 2-3 | 3 | 3 | 2-3 | 2-3 | 3 | 3 |

TABLE 6

| | Notebook 544-19- 1 | 2 | 3 | 4 | 5 | 6 | 7 | 8 |
|---|---|---|---|---|---|---|---|---|
| Top Grade Iotek | 100 | — | — | — | — | — | — | — |
| Primacor 5981 | — | 100 | — | — | — | — | — | — |
| Nucrel 925 | — | — | 100 | — | — | — | — | — |
| Primacor 3414 | — | — | — | 100 | — | — | — | — |
| Nucrel 010 | — | — | — | — | 100 | — | — | — |
| Escor AT-325 | — | — | — | — | — | 100 | — | — |

TABLE 6-continued

| | Notebook 544-19- | | | | | | | |
|---|---|---|---|---|---|---|---|---|
| | 1 | 2 | 3 | 4 | 5 | 6 | 7 | 8 |
| Escor AT-320 | — | — | — | — | — | — | 100 | — |
| Escor AT-310 | — | — | — | — | — | — | — | 100 |
| Weight | 45.2 | 45.1 | 45.0 | 45.1 | 45.0 | 45.1 | 45.1 | 45.2 |
| Compression | 55 | 61 | 60 | 61 | 60 | 62 | 60 | 61 |
| C.O.R. | .806 | .771 | .771 | .761 | .760 | .770 | .765 | .767 |
| Normalized For Table 4 × $\frac{.810}{.806}$ | .810 | .775 | .775 | .765 | .764 | — | — | — |
| Normalized For Table 5 × $\frac{.809}{.806}$ | .809 | — | — | — | — | .773 | .768 | .770 |

What is claimed is:

1. A method for forming a golf ball, comprising the steps of:
   A. providing a golf ball core;
   B. providing an ionic copolymer consisting essentially of a copolymer of an α-olefin having from 2–6 carbon atoms and a sodium or zinc salt of an unsaturated carboxylic acid having from 3–5 carbon atoms, said ionic copolymer having a first coefficient of restitution when formed into a golf ball cover;
   C. providing a non-ionic copolymer consisting essentially of a member of the group consisting of a copolymer of ethylene and acrylic acid; a copolymer of ethylene and methacrylic acid; a copolymer of propylene and acrylic acid; a terpolymer of ethylene, acrylic acid, and a lower alkylacrylate; and blends thereof, said nonionic copolymer having a second coefficient of restitution when formed into a golf ball cover;
   D. blending from 80 to 95 pphr of said ionic copolymer and from 5 to 20 pphr of said non-ionic copolymer to form a blend having a third coefficient of restitution when formed into a golf ball cover, wherein said third coefficient of restitution is greater than the weighted average of the coefficients of restitution of said ionic copolymer and said non-ionic copolymer in said blend; and
   E. forming a cover made of said blend on said golf ball core.

2. The method of claim 1, wherein said non-ionic copolymer consists essentially of from 75 to 85 wt. % ethylene moieties and from 15 to 25 wt. % acrylic acid moieties.

3. The method of claim 1, wherein said non-ionic copolymer consists essentially of 85 wt. % ethylene moieties and 15 wt. % acrylic acid moieties.

4. The method of claim 1, wherein said non-ionic copolymer consists essentially of 75 wt. % ethylene moieties and 25 wt. % acrylic acid moieties.

5. The method of claim 1 wherein the amount of said non-ionic copolymer in the ionic/non-ionic copolymer blend is within the range of 10–15 pphr.

6. The method of claim 5 wherein the non-ionic copolymer is a member of the group consisting of ethylene and acrylic acid, a copolymer of ethylene and methacrylic acid and blends thereof.

7. The method of claim 6 wherein the non-ionic copolymer is a copolymer of ethylene and acrylic acid.

8. The method of claim 6 wherein the non-ionic copolymer is a copolymer of ethylene and methacrylic acid.

9. The method of claim 1 wherein said non-ionic copolymer is a member of the group consisting of a terpolymer of ethylene, acrylic acid and a lower alkyl acrylate; and a terpolymer of ethylene, methacrylic acid, and a lower alkyl acrylate.

10. The method of claim 1 wherein the α-olefin of said ionic copolymer is ethylene, and said unsaturated carboxylic acid is a member of the group consisting of acrylic acid, methacrylic acid and ethacrylic acid.

11. The method of claim 5, wherein said ionic copolymer comprises the copolymer formed between ethylene and a sodium or a zinc salt of acrylic or methacrylic acid.

12. The method of claim 1, wherein said nonionic copolymer is a member of the group consisting of a copolymer of about 75 wt % ethylene and about 25 wt % acrylic acid, a copolymer of about 85 wt % ethylene and about 15 wt. % methacrylic acid, and mixtures thereof.

13. The method of claim 7 wherein said nonionic copolymer is a copolymer of about 75 wt. % ethylene and about 25 wt. % acrylic acid.

14. The method of claim 8 wherein said nonionic copolymer is a copolymer of about 85 wt % ethylene and about 15 wt. % methacrylic acid.

* * * * *